(No Model.)

G. W. ROXBURGH.
WIRE STRETCHING AND SPLICING MACHINE.

No. 552,201. Patented Dec. 31, 1895.

Witnesses
Inventor
Geo. W. Roxburgh

UNITED STATES PATENT OFFICE.

GEORGE W. ROXBURGH, OF ST. MARYS, CANADA.

WIRE STRETCHING AND SPLICING MACHINE.

SPECIFICATION forming part of Letters Patent No. 552,201, dated December 31, 1895.

Application filed May 6, 1895. Serial No. 548,351. (No model.)

*To all whom it may concern:*

Be it known that I, GEORGE WOOD ROXBURGH, of St. Marys, in the county of Perth, Province of Ontario, Canada, have invented a certain new and useful Wire Stretching and Splicing Machine; and I hereby declare that the following is a full, clear, and exact description of the same.

This invention relates to a machine for stretching and splicing wire adapted principally for use in connection with the erection of wire fences, although it may be employed for other purposes where it is necessary to stretch and splice two or more wire strands; and the object of the invention is to so construct the machine that it can be employed to take up the slack and splice the adjacent meeting ends of the wire strands in one continuous and rapid operation, or to splice an immediate piece to the ends of the wire strands in the event of the wire strands being so far asunder as to render it impossible to splice the adjacent meeting ends; and the invention consists essentially of the bed-frame on which are mounted two movable carriages, one of the carriages provided with mechanism for operating the machine to stretch the wire to the required tension, the other carriage carried by the bed-frame and capable of being independently moved to any required position on the frame, each carriage so constructed as to readily receive and firmly hold its respective wire strand until the operations of stretching and splicing have been completed, and then to readily release the wire after the stretching and splicing have been completed, the whole device being hereinafter more fully set forth and more particularly pointed out in the claims.

Figure 1:
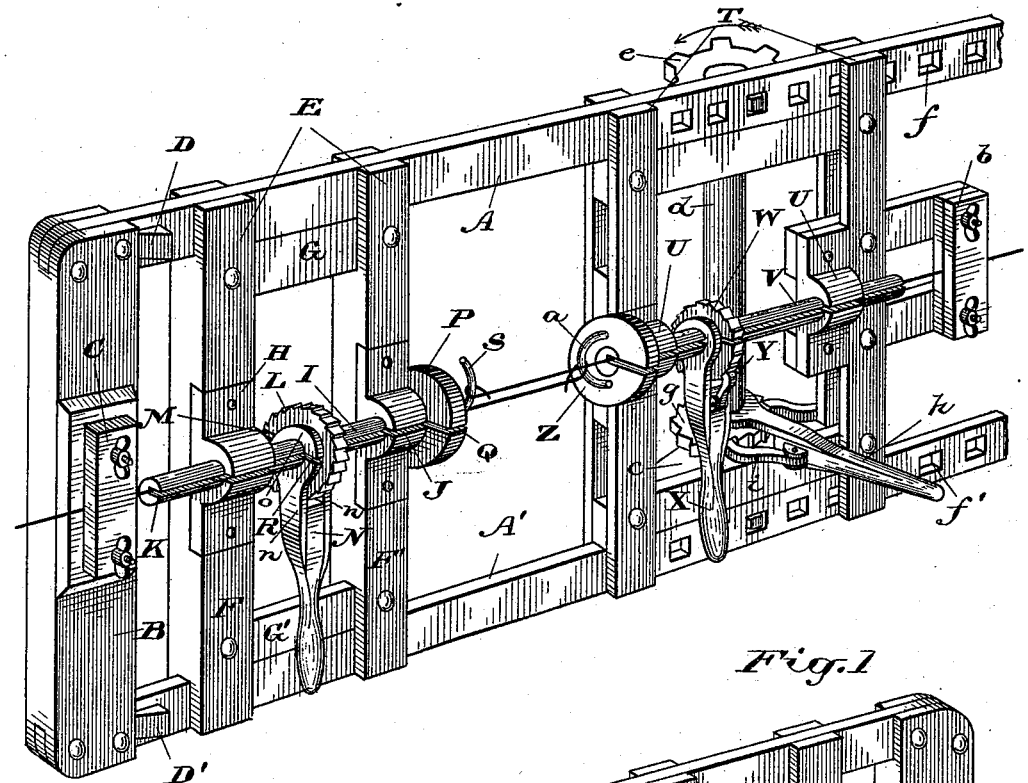
Figure 2:
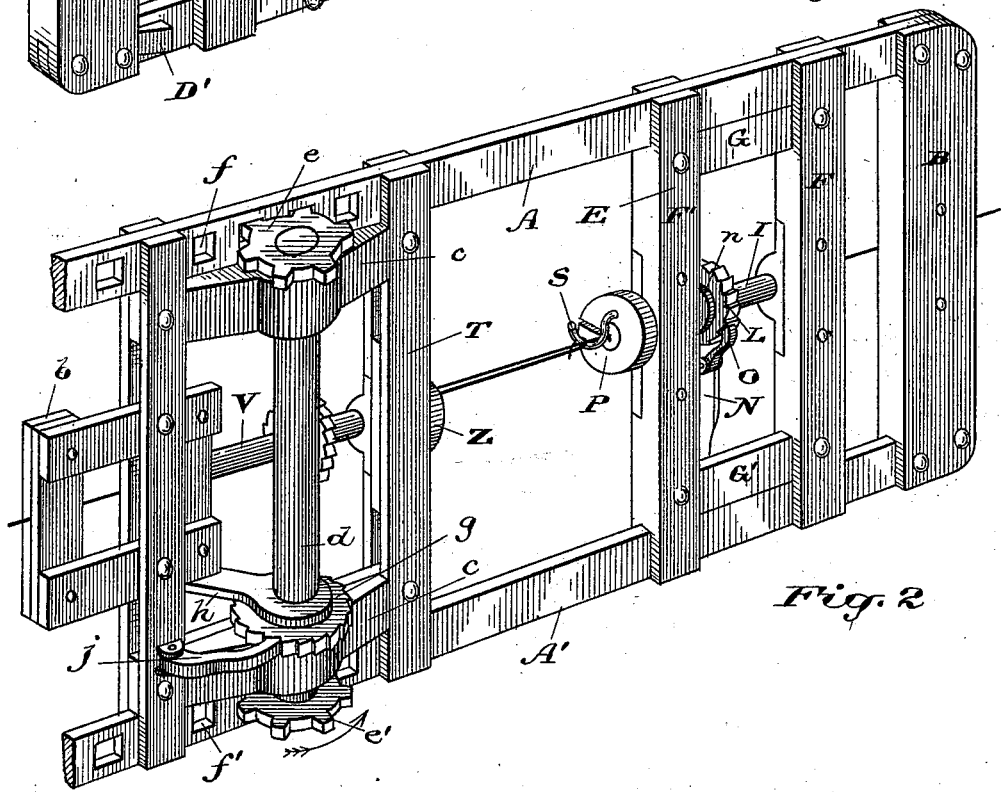

In the drawings, Figure 1 is a perspective view of the front or obverse side of the apparatus. Fig. 2 is a view of the back or reverse side of the apparatus.

Like letters of reference refer to like parts throughout the specification and drawings.

The apparatus consists of a bed-frame comprised of two opposite sides A A', respectively. Bolted, riveted, or otherwise secured to the one end of the sides A and A' is an end plate B of sufficient width and strength to render the bed-frame comparatively rigid.

Mounted on the obverse side of the end plate B is a clamp C intended to receive one strand of the wire and of sufficient pressure to firmly hold the strand and prevent its displacement during the process or operation of stretching.

Mounted on each of the sides A and A' slightly remote from the end plate B is a stop respectively D and D' to arrest the carriage E at a point slightly remote from the end plate B. The carriage E is slidably movable on the opposite sides A and A' and consists of a substantially rectangular frame composed of two opposite sides F and F' respectively slidably connected to the sides A and A'.

Connecting together the sides F and F' are two end pieces G and G'. Mounted on the obverse side of each of the sides F and F' is a bearing H for the spindle I. The centers of the bearings H are in line with each other and with the middle of the clamp C, and formed through the middle of the top of each of the bearings H is a slot J, which is parallel with the longitudinal axis of the spindle I. The spindle I is slidably movable in the bearings H, and formed in the spindle I and extending from end to end thereof is a groove K.

Rigidly mounted on the spindle I at or about the middle thereof is a ratchet-wheel L, and formed through the ratchet-wheel L is a slot M which is in alignment with and forms a continuation of the groove K. Revolubly mounted on the spindle I is a lever N to which is pivotally connected a dog O. By means of the lever N and dog O the ratchet-wheel and spindle are caused to revolve. Rigidly mounted on that end of the spindle I remote from the end plate B is a splicing-wheel P having a slot Q in line with and a continuation of the groove K.

It might here be stated that the lever N is bifurcated, and that the ratchet-wheel L is located between the forked ends *n n* of the lever. Each of the forked ends *n* of the lever N is provided with a collar *o* which encircles the spindle I, and each of the collars *o* is slotted to correspond with the slot in the ratchet-wheel.

The slots R in the collars *o* are in line with each other and correspond in width with the groove K in the spindle I. The arrangement of the slots in the bearings, the ratchet-wheel, the splicing-wheel and the collars of the bifurcated lever permit of the wire strands being readily placed in the groove K in the spindle to allow of the spindle and splicing-wheel turning the wire to form a coil on the opposite strand, and afterward as readily removed. The side face of the splicing-wheel P is provided with an attachment S for holding the end of the opposite strand. Slidably movable on the opposite sides A and A' is a similar carriage T provided with slotted bearings U in which is mounted the slidably-movable grooved spindle V, and rigidly mounted on the spindle V at or about the middle thereof is a slotted ratchet-wheel W, operated by a bifurcated lever X and dog Y. Mounted on that end of the grooved spindle V contiguous to the carriage E is a slotted splicing-wheel Z having a holding attachment $a$ for the end of the wire strand carried by the carriage E. Connected to the frame of the carriage T is a clamp $b$, the middle of which is in alignment with the center of the spindle V.

It might here be stated that the center of the spindle V is in alignment with the center of the spindle I in order that the two strands of wire carried by their respective carriages E and T will be in line with each other.

It might here be stated that the spindles I and V are so connected to the carriages as to be parallel with the line of direction of the said carriages, or, in other words, parallel with the opposite sides A and A' on which the said carriages move.

Mounted on the reverse side of the carriage T are the bearings $c$ for the spindle $d$, equal in length at least to the width of the space between the outer edges of the sides A and A'. Mounted on the spindle $d$ are two pinion-wheels $e$ and $e'$. Each of the opposite sides A and A' is provided with a series of teeth $f$ and $f'$, respectively, in order that the opposite sides will serve the purpose of a rack. Meshing with the teeth $f$ and $f'$, respectively, are the teeth of the pinion-wheels $e$ and $e'$.

Rigidly mounted on the spindle $d$ intermediate the pinion-wheels $e$ and $e'$ is a ratchet-wheel $g$, and revolubly connected to the spindle $d$ is a bifurcated lever $h$, the forks of which are located one on either side of the ratchet-wheel $g$. Pivoted to the lever $h$ is a dog $i$. By means of the lever $h$ and the dog $i$ the spindle $d$ and pinion-wheels $e$ and $e'$ are caused to revolve in the direction indicated by arrows, and the teeth of the pinion-wheels $e$ and $e'$ meshing with the teeth $f$ and $f'$ of the racks cause the carriage T to move toward the carriage E, to stretch the wire to any required tension. Pivoted to the reverse side of the frame of the carriage T is a recoil-dog $j$ which engages with the ratchet-wheel $g$ and prevents the recoil of the ratchet-wheel $g$ during the operation of the lever $h$ while the carriage T is being moved toward the carriage E. When it is required to move the carriage T in the opposite direction the dogs $i$ and $j$ are thrown out of mesh with the teeth of the ratchet-wheel $g$, and the carriage T is moved back to its starting position at its respective end of the bed-frame.

The operation of the machine is as follows: The end of the wire strand to be carried by the carriage T is placed in the groove in the spindle V, extending beyond the splicing-wheel Z, and is firmly held by the clamp $b$. The end of the opposite strand is similarly held by the clamp C and spindle I, the end of the said opposite strand extending beyond the splicing-wheel P. The lever H is then operated to bring the carriages E and T together, and when the required tension has been placed on the wire strand the end of the wire strand carried by the carriage T is connected to the holding attachment S on the splicing-wheel P, and the wire strand carried by the carriage E is connected to the holding attachment $a$ on the splicing-wheel Z. The spindle I with its splicing-wheel P and the spindle V with its splicing-wheel Z are moved toward each other to the fullest capacity of the said spindles. The spindles are then alternately rotated to cause first one strand to coil itself on the other strand, and then to cause the other strand to coil itself on the first strand to make a strong and secure splice. The splicing-wheels with their respective spindles move back toward their respective carriages as the splicing-coils increase in length. By means of this machine it is possible by one continuous and rapid operation to splice together the ends of a broken strand of wire or to connect together the ends of two lengths of wire.

Having thus fully described my invention, what I claim as new, and desire to secure by Letters Patent, is—

1. In a wire stretching and splicing machine the combination with the bed-frame of a carriage mounted on the bed-frame, a spindle journaled in bearings mounted on the carriage, a splicing wheel connected to the spindle, and means for causing the revolution of the splicing wheel and spindle, substantially as specified.

2. In a wire stretching and splicing machine the combination with the bed-frame of a movable carriage mounted on the bed-frame, a spindle journaled in bearings mounted on the carriage, a splicing wheel connected to the spindle, means for causing the revolution of the splicing wheel and spindle, and means for moving the movable carriage on the bed-frame, substantially as specified.

3. In a wire stretching and splicing machine the combination with the bed-frame of a carriage mounted on the bed-frame, a spindle journaled in bearings mounted on the carriage, a splicing wheel connected to the spindle, means for causing the revolution of the splicing wheel and spindle, a movable carriage mounted on the bed-frame consisting of a spindle journaled in bearings mounted on the carriage, a splicing wheel connected to the spindle, means for causing the revolution of the splicing wheel and spindle, and means for moving the movable carriage, substantially as specified.

4. In a wire stretching and splicing machine the combination with the bed-frame of a movable carriage mounted on the bed-frame, a clamp connected to the movable carriage to hold one of the wire strands, a spindle slidably journaled in bearings mounted on the movable carriage, a splicing wheel connected to the spindle, means for causing the revolution of the splicing wheel and spindle, and means for moving the movable carriage on the bed-frame, substantially as specified.

5. In a wire stretching and splicing machine the combination with the bed-frame of a clamp connected to the bed-frame, adapted to hold one of the wire strands, a carriage movably mounted on the bed-frame, slotted bearings mounted on the movable carriage, a grooved spindle journaled in the slotted bearings a splicing wheel mounted on the end of the said spindle having a slot in line with and forming a continuation of the groove in the spindle, a holding attachment connected to the splicing wheel, and means for revolving the spindle and splicing wheel, substantially as specified.

6. In a wire stretching and splicing machine the combination with the bed-frame of a clamp connected to the bed-frame, adapted to hold one of the wire strands, a carriage movably mounted on the bed-frame, slotted bearings mounted on the movable carriage, a grooved spindle journaled in the slotted bearings, a splicing wheel mounted on the end of the said spindle having a slot in line with and forming a continuation of the groove in the spindle, a holding attachment connected to the splicing wheel, means for revolving the spindle and splicing wheel, a movable carriage mounted on the bed-frame, slotted bearings mounted on the movable carriage, a grooved spindle journaled in the bearings, a splicing wheel mounted on the spindle, having a slot extending from its center to its periphery in line with and forming a continuation of the groove in the spindle, a holding attachment connected to the splicing wheel, means for causing the revolution of the spindle and splicing wheel, a clamp connected to the movable carriage to receive and firmly hold one of the wire strands, and means for moving the movable carriage on the bed-frame, substantially as specified.

Toronto, April 22, 1895.

G. W. ROXBURGH.

In presence of—
C. H. RICHES,
J. M. ROXBURGH.